(12) United States Patent
Chi et al.

(10) Patent No.: US 10,994,689 B2
(45) Date of Patent: May 4, 2021

(54) RETRACTABLE SIDE PROTECTING AIRBAG FOR CHILD SAFETY SEAT

(71) Applicant: Zhejiang Boan Mother and Child Products Co. Ltd., Wenzhou (CN)

(72) Inventors: Renhu Chi, Ruian (CN); Ruiwei Chi, Ruian (CN); Xiaoguang Zhang, Shanghai (CN)

(73) Assignee: ZHEJIANG BOAN MOTHER AND CHILD PRODUCTS CO. LTD., Wenzhou (CN)

( * ) Notice: Subject to any disclaimer, the term of this patent is extended or adjusted under 35 U.S.C. 154(b) by 106 days.

(21) Appl. No.: 16/502,035

(22) Filed: Jul. 3, 2019

(65) Prior Publication Data

US 2020/0017062 A1 Jan. 16, 2020

(30) Foreign Application Priority Data

Jul. 12, 2018 (CN) .......................... 201810764343.3

(51) Int. Cl.
  B60R 21/231 (2011.01)
  B60N 2/28 (2006.01)
  (Continued)

(52) U.S. Cl.
  CPC ...... B60R 21/23138 (2013.01); B60N 2/2884 (2013.01); B60R 21/16 (2013.01);
  (Continued)

(58) Field of Classification Search
  CPC ....... B60R 21/02; B60R 21/022; B60R 21/16; B60R 21/2072; B60R 21/215;
  (Continued)

(56) References Cited

U.S. PATENT DOCUMENTS

| 4,773,673 A * | 9/1988 | Sakurai ................. B60R 21/215 280/728.3 |
| 2007/0013177 A1* | 1/2007 | Abe ...................... B60R 21/239 280/739 |

(Continued)

FOREIGN PATENT DOCUMENTS

CN 107985143 A * 5/2018

*Primary Examiner* — Paul N Dickson
*Assistant Examiner* — Scott F. Underwood
(74) *Attorney, Agent, or Firm* — Bayramoglu Law Offices LLC

(57) ABSTRACT

The present invention discloses a retractable side protecting airbag for a child safety seat which includes a side protecting base provided on an outer side surface of the seat body. Specifically, the side protecting base is provided with the retractable side protecting airbag. The retractable side protecting airbag is correspondingly provided with an air deflating hole. The side protecting airbag is internally provided with a resetting structure. An outer end of the retractable side protecting airbag is provided with a side protecting cover. The protecting cover and the side protecting base are locked to each other and work collaboratively for folding the retractable side protecting airbag. The present invention has a reasonable structure and a long distance for crumpling, and is capable of providing buffering and effective energy absorption, thereby greatly reducing the damage to children from side crashes.

4 Claims, 3 Drawing Sheets

(51) Int. Cl.
 *B60R 21/16* (2006.01)
 *B60R 21/215* (2011.01)
 *B60R 21/239* (2006.01)
(52) U.S. Cl.
 CPC .......... *B60R 21/215* (2013.01); *B60R 21/239* (2013.01); *B60R 2021/165* (2013.01); *B60R 2021/21518* (2013.01); *B60R 2021/23146* (2013.01)
(58) Field of Classification Search
 CPC ............ B60R 21/23138; B60R 21/239; B60R 2021/0273; B60R 2021/0293; B60R 2021/165; B60R 2021/21518; B60R 2021/23146
 See application file for complete search history.

(56) References Cited

U.S. PATENT DOCUMENTS

| | | | |
|---|---|---|---|
| 2009/0008914 A1* | 1/2009 | Breuninger | B60N 2/4279 280/730.2 |
| 2017/0274861 A1* | 9/2017 | Hatakeyama | B60R 21/207 |

* cited by examiner

RETRACTABLE SIDE PROTECTING AIRBAG FOR CHILD SAFETY SEAT

CROSS REFERENCE TO RELATED APPLICATIONS

This application is based upon and claims priority to Chinese Patent Application No. 201810764343.3, filed on Jul. 12, 2018 the entire contents of which are incorporated herein by reference.

TECHNICAL FIELD

The present invention relates to an improvement of a child safety seat, particularly to an improvement of a retractable side protecting airbag for the child safety seat.

BACKGROUND

Side protecting components of the child safety seats available on the market are mainly mechanical hard protrusions which either cannot crumple and absorb energy in a side crash, or instantly retract into the seat when being subjected to the side crash, and are incapable of absorbing energy, effectively. Moreover, due to the limitation of side space, the popped out side protecting component is not allowed to stretch in a wide range, resulting in a short distance for effective buffering during the side crash, so the effect of energy absorption is greatly reduced.

SUMMARY

The technical problem to be addressed by the present invention is to overcome the drawbacks of the prior art by providing a safe and reliable retractable side protecting airbag for a child safety seat with a reasonable structure.

To solve the above technical problems, the present invention is implemented with the following technical solutions. The retractable side protecting airbag for a child safety seat includes a side protecting base provided on an outer side surface of a seat body, wherein the side protecting base is provided with a retractable side protecting airbag, the side protecting airbag is correspondingly provided with an air deflating hole, the side protecting airbag is provided with a resetting structure; an outer end of the side protecting airbag is provided with a side protecting cover, the side protecting cover and the side protecting base are able to be locked to each other and work collaboratively for folding the side protecting airbag.

The side protecting base is provided with a cover locking member, and the side protecting cover is provided with a locking member matching with the cover locking member for locking. The cover locking member and the locking member respectively penetrate into the side protecting airbag.

The resetting structure is a resetting spring, and two ends of the resetting spring respectively abut on two sides of the side protecting airbag.

The side protecting base is provided with an accommodating recess, the accommodating recess fits and stores the deflated side protecting airbag.

A shape of the side protecting airbag is a wavy shape.

The present invention has the following advantages. The modified retractable side protecting airbag for the child safety seat allows folding the airbag after deflation with a wavy structure of the airbag, greatly reducing the occupancy of space. When the airbag pops out and gets activated, stretched length of the airbag is 2-3 times of the stretched length of the conventional side protecting airbag. Moreover, when a side crash happens, buffering and effective energy absorption can be allowed during the entire crumpling travel with the continuous air deflation through the air deflating hole, so the damage caused by the side crashes to children is greatly reduced.

BRIEF DESCRIPTION OF THE DRAWINGS

The specific embodiments of the present invention will be described in detail hereinafter with reference to the drawings.

DETAILED DESCRIPTION OF THE EMBODIMENTS

Figure 1:
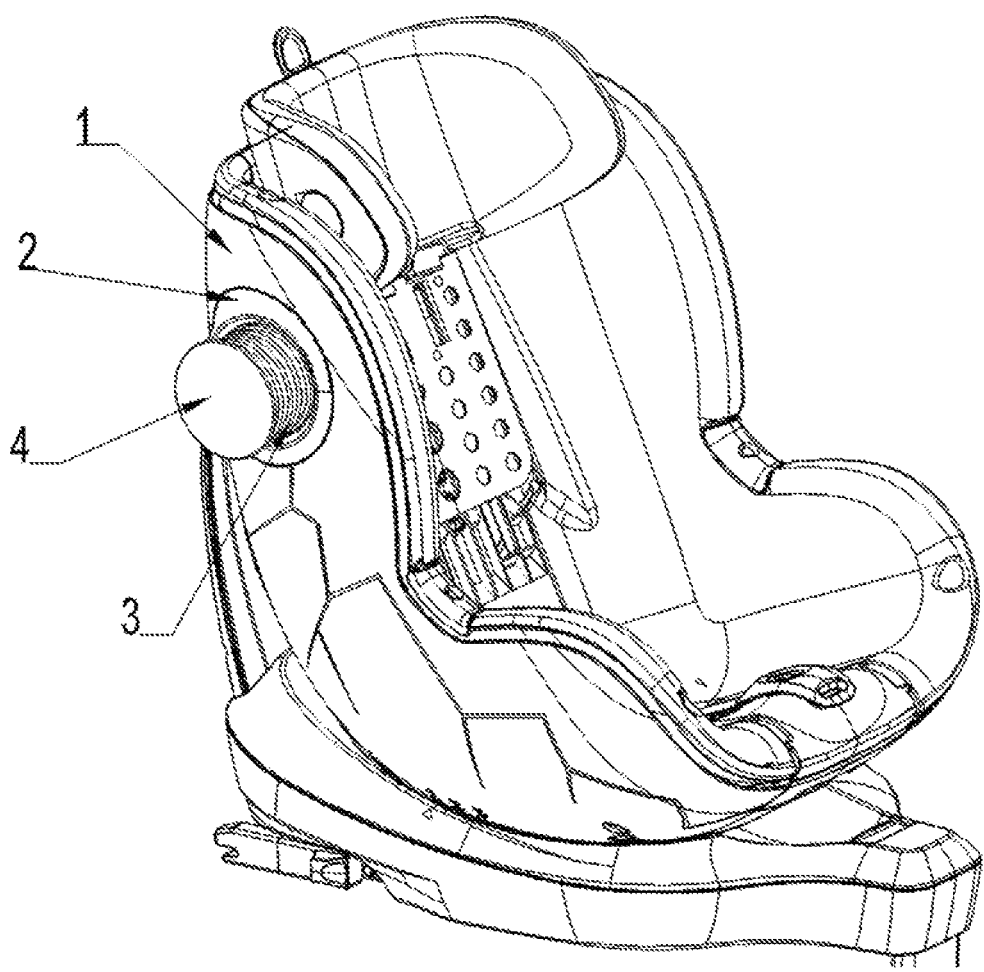
FIG. 1 is a structural diagram of the present invention.
Figure 2:
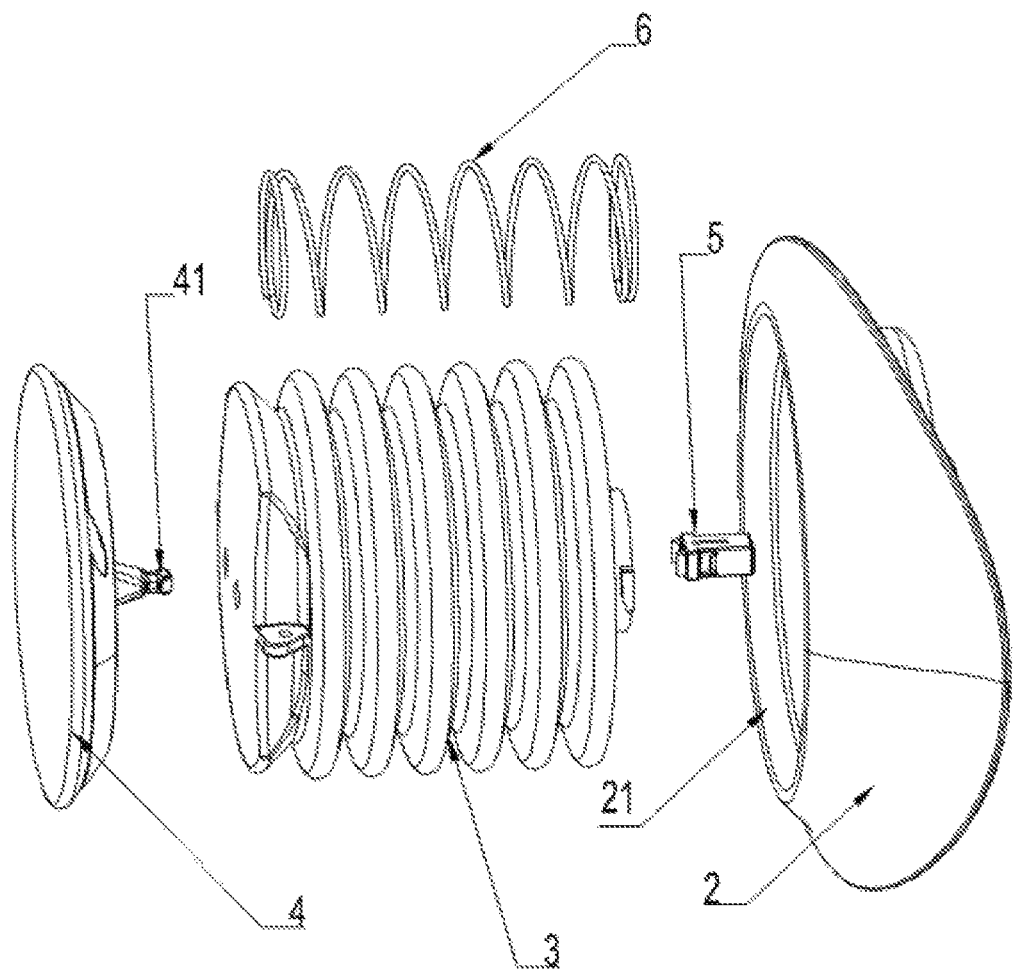
FIG. 2 is an exploded view of a structure of the present invention.
Figure 3:
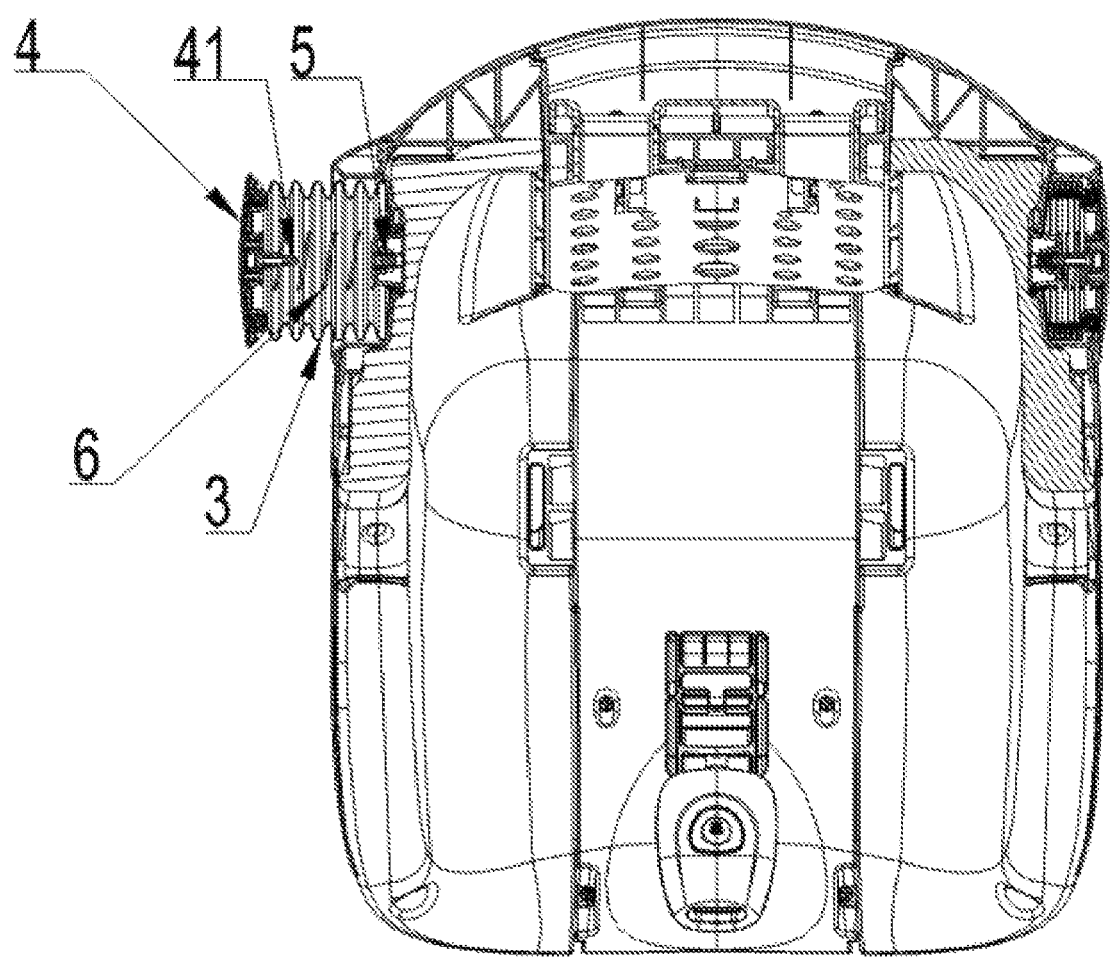
FIG. 3 is a sectional view showing the structure of the present invention.

The structure of the present invention is illustrated by the drawings, and the related details are further illustrated hereinafter with reference to the drawings. A retractable side protecting airbag for a child safety seat includes the side protecting base 2 provided on an outer side surface of the seat body 1. The side protecting base 2 is fixedly provided with the retractable side protecting airbag 3. The retractable side protecting airbag 3 has a wavy shape, so the retracting property of the retractable side protecting airbag 3 is improved. The side protecting airbag 3 is correspondingly provided with an air deflating hole (not shown in drawings). The air deflating hole enables the airbag to provide buffering and effective energy absorption during the entire crumpling travel. The retractable side protecting airbag 3 is internally provided with a resetting structure for resetting the deflated retractable side protecting airbag 3, so as to make the retractable side protecting airbag 3 maintain a stretched state. The resetting structure is the resetting spring 6, and two ends of the resetting spring 6 respectively abut on two sides of the retractable side protecting airbag 3. An outer end of the side protecting airbag 3 is fixedly provided with the side protecting cover 4. The side protecting cover 4 and the side protecting base 2 are locked to each other and work collaboratively to fold the retractable side protecting airbag 3. Specifically, the side protecting base 2 is provided with the cover locking member 5. The side protecting cover 4 is provided with the locking member 41 matching with the cover locking member 5 for locking. The cover locking member 5 and the locking member 41 respectively penetrate into the retractable side protecting airbag 3. The side protecting base 2 is provided with the accommodating recess 21. The accommodating recess 21 fits and stores the deflated side protecting airbag 3 to hide the deflated side protecting airbag 3 in the accommodating recess 21 of the retractable side protecting base 2.

In the implementation of the present invention, the side protecting cover 4 is pressed down, and the locking member 41 goes into the cover locking member 5. The retractable side protecting airbag 3 is in a deflated state and is locked. When the side protecting cover 4 is pressed down again, and the locking member 41 is detached from the cover locking member 5. The retractable side protecting airbag 3 is popped out under the force applied by the setting spring 6 and gets into the use state.

In conclusion, the above-mentioned embodiments are merely the preferred embodiments of the present invention rather than limitations to the scope of the present invention. Any modifications, equivalent substitutions, or improvements derived based on the concepts and materials of the present invention should be considered as falling within the scope of the present invention.

What is claimed is:

1. A retractable side protecting airbag for a child safety seat comprising a side protecting base provided on an outer side surface of a seat body,
   wherein the side protecting base is provided with the retractable side protecting airbag, the retractable side protecting airbag is provided with an air deflating hole, and the retractable side protecting airbag is further provided with a resetting structure;
   an outer end of the retractable side protecting airbag is provided with a side protecting cover, and the side protecting cover and the side protecting base are locked to each other and work collaboratively for folding the retractable side protecting airbag; wherein the side protecting base is provided with a cover locking member, and the side protecting cover is provided with a locking member matching with the cover locking member for locking, and
   wherein the cover locking member and the locking member respectively penetrate into the retractable side protecting airbag.

2. A retractable side protecting airbag for a child safety seat comprising a side protecting base provided on an outer side surface of a seat body,
   wherein the side protecting base is provided with the retractable side protecting airbag, the retractable side protecting airbag is provided with an air deflating hole, and the retractable side protecting airbag is further provided with a resetting structure;
   an outer end of the retractable side protecting airbag is provided with a side protecting cover, and the side protecting cover and the side protecting base are locked to each other and work collaboratively for folding the retractable side protecting airbag;
   wherein the resetting structure is a resetting spring, and two ends of the resetting spring respectively abut on two sides of the retractable side protecting airbag.

3. The retractable side protecting airbag for a child safety seat according to claim 1, wherein the side protecting base is provided with an accommodating recess, and the accommodating recess fits and stores the retractable side protecting airbag in a deflated state.

4. The retractable side protecting airbag for a child safety seat according to claim 1, wherein a shape of the retractable side protecting airbag is a wavy shape.

* * * * *